United States Patent
Ichikawa et al.

(10) Patent No.: US 7,756,619 B2
(45) Date of Patent: Jul. 13, 2010

(54) ACTIVE VIBRATION INSULATOR

(75) Inventors: Hiroyuki Ichikawa, Kani (JP); Takayoshi Yasuda, Iwakura (JP); Hideki Oshima, Komaki (JP); Takehiko Fushimi, Kariya (JP); Daichi Mizushima, Anjo (JP); Kenichi Sato, Nagoya (JP)

(73) Assignee: Tokai Rubber Industries, Ltd., Komaki-shi (JP)

( * ) Notice: Subject to any disclaimer, the term of this patent is extended or adjusted under 35 U.S.C. 154(b) by 1066 days.

(21) Appl. No.: 11/450,461

(22) Filed: Jun. 12, 2006

(65) Prior Publication Data
US 2006/0287788 A1   Dec. 21, 2006

(30) Foreign Application Priority Data
Jun. 15, 2005 (JP) .............................. 2005-175311

(51) Int. Cl.
*B60G 23/00* (2006.01)

(52) U.S. Cl. .............................. 701/36; 701/37; 701/38; 701/39; 701/70; 701/71; 280/5.507; 280/5.508; 280/5.511; 280/5.514; 280/5.515; 303/113.1; 303/155; 303/157; 303/167; 303/173; 180/197; 180/249; 180/305; 73/105

(58) Field of Classification Search .............. 701/37, 701/38, 39, 70, 71, 78, 79, 80, 85; 280/5.507, 280/5.508, 5.511, 5.514, 5.515, 5.52, 124.107; 303/113.1, 155, 157, 167, 173, 187; 180/197, 180/249, 305; 73/105

See application file for complete search history.

(56) References Cited

U.S. PATENT DOCUMENTS

| | | | | |
|---|---|---|---|---|
| 4,743,046 A | * | 5/1988 | Schnittger | ................ 280/5.519 |
| 4,840,247 A | * | 6/1989 | Kashihara et al. | ........... 180/249 |
| 5,222,570 A | * | 6/1993 | Kawamura et al. | .......... 180/197 |
| 5,444,621 A | * | 8/1995 | Matsunaga et al. | ............ 701/37 |
| 5,458,405 A | * | 10/1995 | Watanabe | .................... 303/173 |
| 5,657,229 A | * | 8/1997 | Naito et al. | .................... 701/71 |
| 5,719,565 A | * | 2/1998 | Tsuno et al. | ................. 340/905 |
| 5,802,486 A | * | 9/1998 | Uchiyama | ..................... 701/37 |
| 5,848,663 A | | 12/1998 | Kuriki | |
| 6,385,525 B2 | * | 5/2002 | Watanabe et al. | .............. 701/80 |
| 6,600,987 B2 | * | 7/2003 | Ohtsu | .......................... 701/71 |
| 7,236,884 B2 | * | 6/2007 | Matsumoto et al. | .......... 701/300 |

(Continued)

FOREIGN PATENT DOCUMENTS

JP          6-33980          2/1994

(Continued)

*Primary Examiner*—Khoi Tran
*Assistant Examiner*—McDieunel Marc
(74) *Attorney, Agent, or Firm*—Oblon, Spivak, McClelland, Maier & Neustadt, L.L.P.

(57) ABSTRACT

An active vibration insulator includes an electromagnetic actuator, a controller, and a bad-roads processor. The electromagnetic actuator generates vibrating forces depending on electric-current supplies. The controller carries out vibrating-forces generation control. In the vibrating-forces generation control, the electric-current supplies are made variable so as to actively inhibit vibrations generated by an on-vehicle vibration generating source of a vehicle from transmitting to a specific part of the vehicle based on cyclic pulsating signals output from the on-vehicle vibration generating source. Thus, the controller lets the electromagnetic actuator generate the vibrating forces. The bad-roads processor stops the vibrating-forces generation control effected by the controller when the vehicle travels on bad roads.

7 Claims, 4 Drawing Sheets

U.S. PATENT DOCUMENTS

2004/0230375 A1 * 11/2004 Matsumoto et al. ......... 701/301

FOREIGN PATENT DOCUMENTS

| | | |
|---|---|---|
| JP | 6-316223 | 11/1994 |
| JP | 7-186803 | 7/1995 |
| JP | 8-261274 | 10/1996 |
| JP | 9-291966 | 11/1997 |
| JP | 10-318325 | 12/1998 |
| JP | 2001-1768 | 1/2001 |

* cited by examiner

ACTIVE VIBRATION INSULATOR

BACKGROUND OF THE INVENTION

1. Field of the Invention

The present invention relates to an active vibration insulator, especially, an active vibration insulator for actively inhibiting the vibrations of vibration generating sources, such as on-vehicle engines, from transmitting.

2. Description of the Related Art

Active vibration insulators of this type drive an active engine mount, which can generate active vibrating forces, and can thereby inhibit vibrations, which are transmitted from an engine, from transmitting to the other parts of a vehicle. However, when the active engine mount is thus driven, it consumes energy so that the vehicle's mileage has deteriorated. Hence, Japanese Unexamined Patent Publication (KOKAI) No. 10-318, 325, for instance, discloses to relieve the mileage deterioration accompanied by actuating an active engine mount. The disclosed technique utilizes the fact that, when the levels of vibrations, which are transmitted from parts of a vehicle other than an engine, are high, the levels of vibrations, which vehicle passengers sense, are not reduced so much even if an engine mount is driven to reduce the levels of vibrations, which are transmitted from the engine. Specifically, when the levels of vibrations, which are transmitted from parts of a vehicle other than an engine, are high, signals for actuating an active engine mount are kept low. By thus keeping the actuating signals low, it is possible to reduce the energy, which the active engine mount consumes. As a result, it is possible to relieve the mileage degradation.

However, when a vehicle travels on bad roads, the vehicle vibrates greatly. As the vehicle vibrates, the plunger of an electromagnetic actuator, which an active engine mount of an active vibration insulator carries, reciprocates regardless of control. Note herein that, when the plunger of an electromagnetic actuator reciprocates, the inductance of the electromagnetic actuator changes because the distance between the plunger and core of the electromagnetic actuator varies. Moreover, when actuating the active engine mount, there is a fear that an overcurrent might flow in the core of the electromagnetic actuator and the actuating circuit of a controller depending on the changing inductance, because an actuating voltage is applied to the coil, which makes the core of the electromagnetic actuator. This fact results in a fear that, even when the actuating signals for the electromagnetic actuator of the active engine mount are kept low during the vehicle's driving on bad roads as described above, overcurrents might flow in the core of the electromagnetic actuator and the actuating circuit of a controller. In addition, when an overcurrent flows in the coil and actuating circuit, there occurs a fear that the electromagnetic actuator and controller might break down.

SUMMARY OF THE INVENTION

The present invention has been developed in view of the aforementioned circumstance. It is therefore an object of the present invention to provide an active vibration insulator which can inhibit electromagnetic actuators and controllers from breaking down even when vehicles travel on bad roads.

An active vibration insulator according to the present invention comprises:

an electromagnetic actuator for generating vibrating forces depending on electric-current supplies;

a controller for carrying out vibrating-forces generation control in which the electric-current supplies are made variable so as to actively inhibit vibrations generated by an on-vehicle vibration generating source of a vehicle from transmitting to a specific part of the vehicle based on cyclic pulsating signals output from the on-vehicle vibration generating source, thereby letting the electromagnetic actuator generate the vibrating forces; and a bad-roads processor for stopping the vibrating-forces generation control effected by the controller when the vehicle travels on bad roads.

Note herein that the electromagnetic actuator comprises a core around which a coil is wound, and a plunger disposed reciprocably with respect to the core, for instance.

Specifically, the present active vibration insulator stops the vibrating-forces generation control, which is effected by the controller, when the vehicle travels on bad roads. Therefore, when the vehicle travels on bad rods, even if the plunger of the electromagnetic actuator moves as the vehicle vibrates so that the inductance of the electromagnetic actuator changes, it is possible to inhibit overcurrents from flowing in the coil of the electromagnetic actuator and the actuating circuit of the controller, for instance. As a result, it is possible to inhibit the electromagnetic actuator and controller of the present active vibration insulator from breaking down.

Moreover, in the present active vibration insulator, it is advisable that the bad-roads can stop the vibrating-forces generation control when the vehicle enters bad roads; and resumes the vibrating-forces generation control when the vehicle returns ordinary roads out of the bad roads.

Here, the term, "ordinary roads," means roads, which cannot be considered bad roads. That is, road surfaces, on which the vehicle travels, are bad roads, or ordinary roads which are not considered bad roads. In other words, the vehicle, which has been travelling on bad roads, returns ordinary roads thereafter out of bad roads. When the vehicle returns ordinary roads out of bad roads, there is no fear that the electromagnetic actuator and controller are broken down by overcurrents as described above. Hence, since the bad-roads processor thus resumes the vibrating-forces generation control when the vehicle returns ordinary roads out of bad roads, it is possible to utilize the present active vibration insulator more effectively.

In such a preferable mode of the present active vibration insulator, it is advisable that the bad-roads processor can comprise:

first judge for judging whether the vehicle enters bad roads based on a first condition;

second judge for judging whether the vehicle returns ordinary roads out of bad roads based on a second condition, which differs from the first condition; and control-stop processor for stopping the vibrating-forces generation control by the controller when the first judge judges that the vehicle enters bad roads, and resuming the vibrating-forces generation control by the controller when the second judge judges that the vehicle returns ordinary roads out of bad roads. Since the first condition and the second condition are thus made different conditions to each other, it is possible to inhibit the stopping and resuming of the vibrating-forces generation control from switching frequently. That is, the present active vibration insulator can carry out the vibrating-forces generation control stably. Moreover, since the first condition and the second condition are made different conditions to each other, it is possible to reliably inhibit the present active vibration insulator from judging the travelling states of the vehicle erroneously.

Here, the following methods are available for how to let the bad-roads processor stop the vibrating-forces generation control, which is effected by the controller, for example. As for a first method, the bad-roads processor controls actuating voltages, which the controller applies to the electromagnetic actuator when the vehicle travels on bad roads, to zero.

Since the actuating voltages are thus controlled to zero, it is possible to securely inhibit overcurrents from flowing in the coil of the electromagnetic actuator and the actuating circuit of the controller even if the plunger of the electromagnetic actuator moves as the vehicle vibrates when the vehicle travels on bad rods.

As for a second method, the bad-roads processor controls actuating voltages, which the controller applies to the electromagnetic actuator when the vehicle travels on bad roads, to a predetermined voltage.

Here, the term, "predetermined voltage," refers to such a voltage that can fasten the plunger of the electromagnetic actuator stationarily with respect to the core. Such a voltage is a very small voltage, compared to voltages for reciprocating the plunger with respect to the core. Thus, even if the plunger of the electromagnetic actuator moves as the vehicle vibrates when the vehicle travels on bad rods, it is possible to reliably inhibit overcurrents from flowing in the coil of the electromagnetic actuator and the actuating circuit of the controller. Moreover, since the present active vibration insulator can inhibit the plunger of the electromagnetic actuator from moving greatly, it is possible to inhibit the damages to other component pats, damages which are accompanied by the greatly moving plunger.

Moreover, it is advisable as well that the present active vibration insulator can further comprise a vibrations-detection sensor for detecting vibrations of the vehicle, wherein:

the bad-roads processor judges whether the vehicle travels on bad roads or not based on the vibrations of the vehicle, which the vibrations-detection sensor detects.

For example, when the vibrations of the vehicle, which the vibrations-detection sensor detects, are great, the present active vibration insulator assumes that the vehicle are travelling on bad roads. Specifically, it is advisable that the first judge of the bad-roads processor can judge that the vehicle enters bad roads when the vibrations of the vehicle, which the vibrations-detection sensor detects, exceed a predetermined threshold value at least a predetermined time within each of plural predetermined continuous periods of time. For example, the first judge of the bad-road processor judges that the vehicle enters bad roads when the vibrations of the vehicle, which the vibrations-detection sensor detects, exceed a predetermined threshold value more than twice, for instance, within one cycle of the cyclic pulsating signals, which are output from an engine, and when they surpass more than twice, for instance, within the subsequent one cycle. Note that the predetermined times in this instance can be once, or can be a plurality of times. In addition, when the first judge of the bad-roads processor can judge that the vehicle enters bad roads when the vibrations of the vehicle, which the vibrations-detection sensor detects, exceed a predetermined threshold value within each of plural predetermined continuous periods of time, it is possible to inhibit the present active vibration insulator from making erroneous judgements, and accordingly it is possible for the present active vibration insulator to make more accurate judgements whether the vehicle enters bad roads. Note that the conditions whether the vehicle enters bad roads or not make the above-described first condition for the first judge of the bad-roads processor.

In addition, it is advisable as well that the present active vibration insulator can further comprise a vibrations-detection sensor for detecting vibrations of the vehicle, wherein:

the second judge judges that the vehicle returns ordinary roads out of bad roads when the vibrations of the vehicle, which the vibrations-detection sensor detects, do not exceed a predetermined threshold value within each of plural predetermined continuous periods of time.

For example, the second judge of the bad-roads processor judges that the vehicle returns ordinary roads out of bad roads when the vibrations of the vehicle, which the vibrations-detection sensor detects, do not exceed a predetermined threshold value, within one cycle of the cyclic pulsating signals, which are output from an engine, and when they do not exceed, within the subsequent one cycle. Moreover, when the second judge of the bad-roads processor can judge that the vehicle returns ordinary roads out of bad roads when the vibrations of the vehicle, which the vibration-detection sensor detects, do not exceed a predetermined threshold value within each of plural predetermined continuous periods of time, it is possible to inhibit the present active vibration insulator from making erroneous judgements, and accordingly it is possible for the present active vibration insulator to make more accurate judgements whether the vehicle returns ordinary roads out of bad roads. Note that the conditions whether the vehicle returns ordinary roads out of bad roads or not make the above-described second condition for the second judge of the bad-road processor.

Note that the vibrations-detecting sensor can comprise an acceleration sensor for detecting the vibrations of the vehicle. The electromagnetic actuators of active vibration insulators have been often driven by means of adaptive control, and the output values of accelerator sensors have been often used to carry out adaptive control. Hence, when utilizing an acceleration sensor, which is used for adaptive control, as the acceleration sensor for judging whether stopping or resuming the vibrating-forces generation control, it is not required to provide a new sensor for that purpose for the present active vibration insulator.

The present active vibration insulator stops the vibrating-forces generation control, which the controller carries out, when the vehicle travels on bad roads. Accordingly, even when the plunger of the electromagnetic actuator moves to change the inductance accompanied by the vibrations of the vehicle, which are travelling on bad roads, the present active vibration insulator can inhibit overcurrents from flowing in the coil of the electromagnetic actuator and the actuating circuit of the controller, for instance. Consequently, it is possible to inhibit the electromagnetic actuator and controller of the present active vibration insulator from breaking down.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Having generally described the present invention, a further understanding can be obtained by reference to the specific preferred embodiments which are provided herein for the purpose of illustration only and not intended to limit the scope of the appended claims.

The present invention will be hereinafter described in more detail while naming its specific embodiments.

Example No. 1

(1) Arrangement of Active Vibration Insulator 1

An arrangement of an active vibration insulator 1 according to an example of the present invention will be hereinafter described with reference to FIG. 1.

Figure 1:
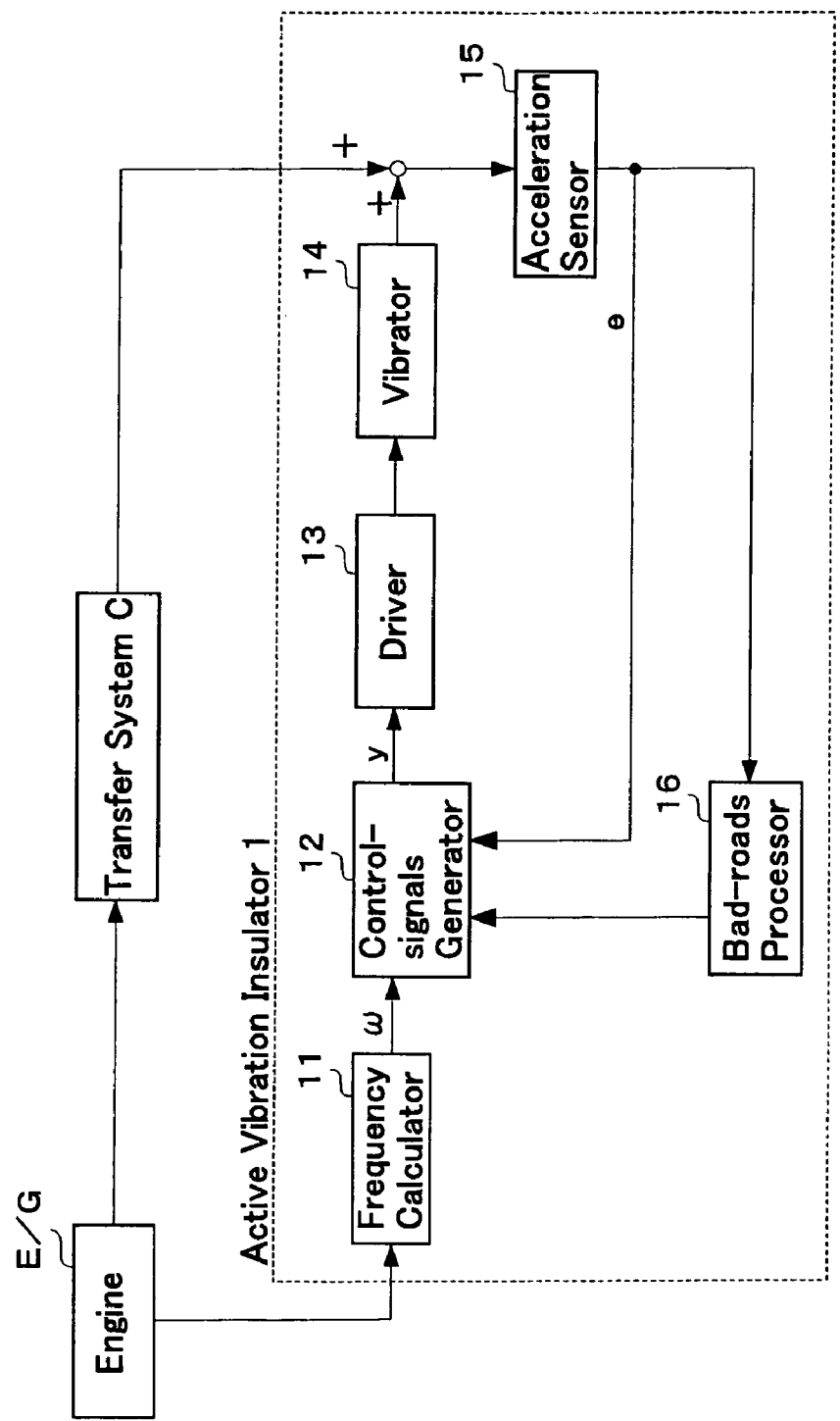
FIG. 1 is a block diagram for illustrating an arrangement of an active vibration insulator 1 according to an example of the present invention.

FIG. 1 is a block diagram for illustrating an arrangement of the active vibration insulator 1. The active vibration insulator 1 is an apparatus for actively inhibiting vibrations, which an engine E/G (i.e., claimed vibration generating source) carried on a vehicle generates, from transmitting to the vehicle's specific parts. As illustrated in FIG. 1, the active vibration insulator 1 comprises a frequency calculator 11, a control-signals generator 12, a driver 13, a vibrator 14, an acceleration sensor 15, and a bad-roads processor 16.

The frequency calculator 11 receives cyclic pulsating signals, which are output from a rotary detector (not shown) for detecting the revolutions of the engine E/G. Then, the frequency calculator 11 calculates the angular frequencies $\omega$ of the cyclic pulsating signals based on the input cyclic pulsating signals.

The control-signals generator 12 (i.e., claimed controller) receives the angular frequencies $\omega$ of the cyclic pulsating signals, which the frequency calculator 11 calculates. Then, the control-signals generator 12 selects either one of a map control mode and an adaptive control mode based on the angular frequencies $\omega$ of the input cyclic pulsating signals. Thus, the control-signals generator 12 generates a cyclic control signal y by means of one of selected modes, that is, a map control mode or an adaptive control mode. When the map control mode is selected, the control-signals generator 12 generates a cyclic control signal y based on the angular frequencies $\omega$ of the cyclic pulsating signals and map data, which are stored in advance. On the other hand, when the adaptive control mode is selected, the control-signals generator 12 generates a cyclic control signal y based on the calculated angular frequencies $\omega$ of the cyclic pulsating signals and an error signal e, which the acceleration sensor 15 detects, by means of an adaptive control method. Note that these cyclic control signals y are signals, which enable the active vibration insulator 1 to actively inhibit the vibrations, which the engine E/G generates at the installation location of the acceleration sensor 16, from transmitting to the vehicle's specific parts.

Moreover, the control-signals generator 12 receives a control permission signal or a control stop signal from the bad-roads processor 16. When the control-signals generator 12 receives the control permission signal from the bad-roads processor 16, the control-signals generator 12 outputs the generated cyclic control signal y to the driver 13. On the other hand, when the control-signals generator 12 receives the control stop signal from the bad-roads processor 16, the control-signals generator 12 does not output the generated cyclic control signal y to the driver 13. In this instance, the control-signals generator 12 outputs a zero signal to the driver 13. That is, the control-signals generator 12 outputs the cyclic control signal y to the driver 13 only when it receives the control permission signal from the bad-roads processor 16. Hereinafter, the control in which the control-signals generator 12 outputs the cyclic control signal y to the driver 13 will be referred to as "vibrating-forces generation control."

The driver 13 (i.e., claimed controller) comprises an driving circuit, and drives the vibrator 14 based on the signals which the control-signals generator 12 outputs. That is, when the control-signals generator 12 outputs the cyclic control signal y, the driver 13 drives the vibrator 14 based on the cyclic control signal y. Specifically, in this instance, the driver 13 applies a driving voltage, which is based on the cyclic control signal y, to the vibrator 14 so that an electric current, which depends on the cyclic control signal y, is supplied to the vibrator 14. On the other hand, when the control-signals generator 12 outputs the zero signal, that is, when the control-signals generator 12 does not output the cyclic control signal y, the driver 13 does not at all drive the vibrator 14 virtually. Specifically, in this instance, the driving voltage, which the driver 13 applies to the vibrator 14, is zero. Thus, the driver 13 drives the vibrator 14 when the bad-roads processor 16 outputs the control permission signal. On the other hand, the driver 13 does not drive the vibrator 14 when the bad-roads processor 16 outputs the control sop signal.

The vibrator 14 (i.e., claimed electromagnetic actuator) comprises a solenoid which is carried on an engine mount 20, which will be described later, for example. The solenoid, the vibrator 14, generates vibrating forces, depending on electric-current supplies, which change cyclically, to its coil. That is, cyclically changing the electric-current supply to the coil of the solenoid, the vibrator 14, can vary the vibrating forces, which the vibrator 14 generates. In other words, when the vibrations, which the engine E/G generates, and the vibrations, which the vibrator 14 generates, cancel to each other completely, for instance, the vibrations of the engine E/G are not transmitted from the engine mount 20 to the vehicle-body side at all.

However, when the bad-roads processor 16 outputs the control permission signal to the control-signals generator 12, the electric-current supply to the coil of the solenoid, the vibrator 14, is dependent on the cyclic control signal y, which the control-signals generator 12 generates. Therefore, the vibrator 14 generates vibrating forces only when the bad-roads processor 16 outputs the control permission signal. On the other hand, when the bad-roads processor 16 outputs the control stop signal to the control-signals generator 12, the electric-current supply to the coil of the solenoid, the vibrator 14, is zero virtually. Therefore, in this instance, the vibrator 14 does not generate vibrating forces. Note that the detailed arrangement of the engine mount 20 will be described later.

The acceleration sensor 15 (i.e., claimed vibrations-detecting sensor) is installed to a fixing part, one of the parts of the later-described engine mount 20, at which the engine mount 20 is fixed to an engine frame E/F. That is, the acceleration sensor 15 detects vibrations at the fixing part, one of the parts of the engine mount 20, which is fixed to the engine frame E/F. Specifically, the acceleration sensor 15 detects vibrations (hereinafter referred to as "error signals") e which are produced by synthesizing the vibrations of the engine E/G, which are transmitted by way of a transfer system C, and the vibrations, which the vibrator 14 generates. The acceleration sensor 15 outputs the error signals e to the control-signals generator 12. The resulting error signals e are used when the control-signals generator 12 selects the adaptive control mode as described above. Note herein that the engine frame E/F vibrates together with the vehicle in the instance that the vehicle itself vibrates, in addition to the instance that the vibrations of the engine E/G are transmitted to the engine frame E/F to vibrate the engine frame E/F. That is, the acceleration sensor 15 detects the vibrations of the vehicle.

The bad-roads processor 16 receives the vibrations of the vehicle, which the acceleration sensor 15 detects. Based on the input vibrations of the vehicle, the bad-roads processor 16 judges whether the vehicle is travelling on bad roads or not. Moreover, when the bad-roads processor 16 judges that the vehicle is not travelling on bad roads, the bad-roads processor 16 outputs the control permission signal to the control-signals generator 12. On the other hand, when the bad-roads processor 16 judges that the vehicle is travelling on bad roads, the bad-roads processor 16 outputs the control stop signal to the control-signals generator 12. That is, when the vehicle is travelling on bad roads, the bad-roads processor 16 stops the vibrating-forces generation control, which the control-signals generator 12 carries out, and controls the actuating voltages, which the driver 13 applies to the vibrator 14, to zero. Note that the detailed arrangement of the bad-roads processor 16 will be described later.

(2) Detailed Arrangement of Engine Mount 20 Comprising

Vibrator 14 and Acceleration Sensor 15

Figure 2:
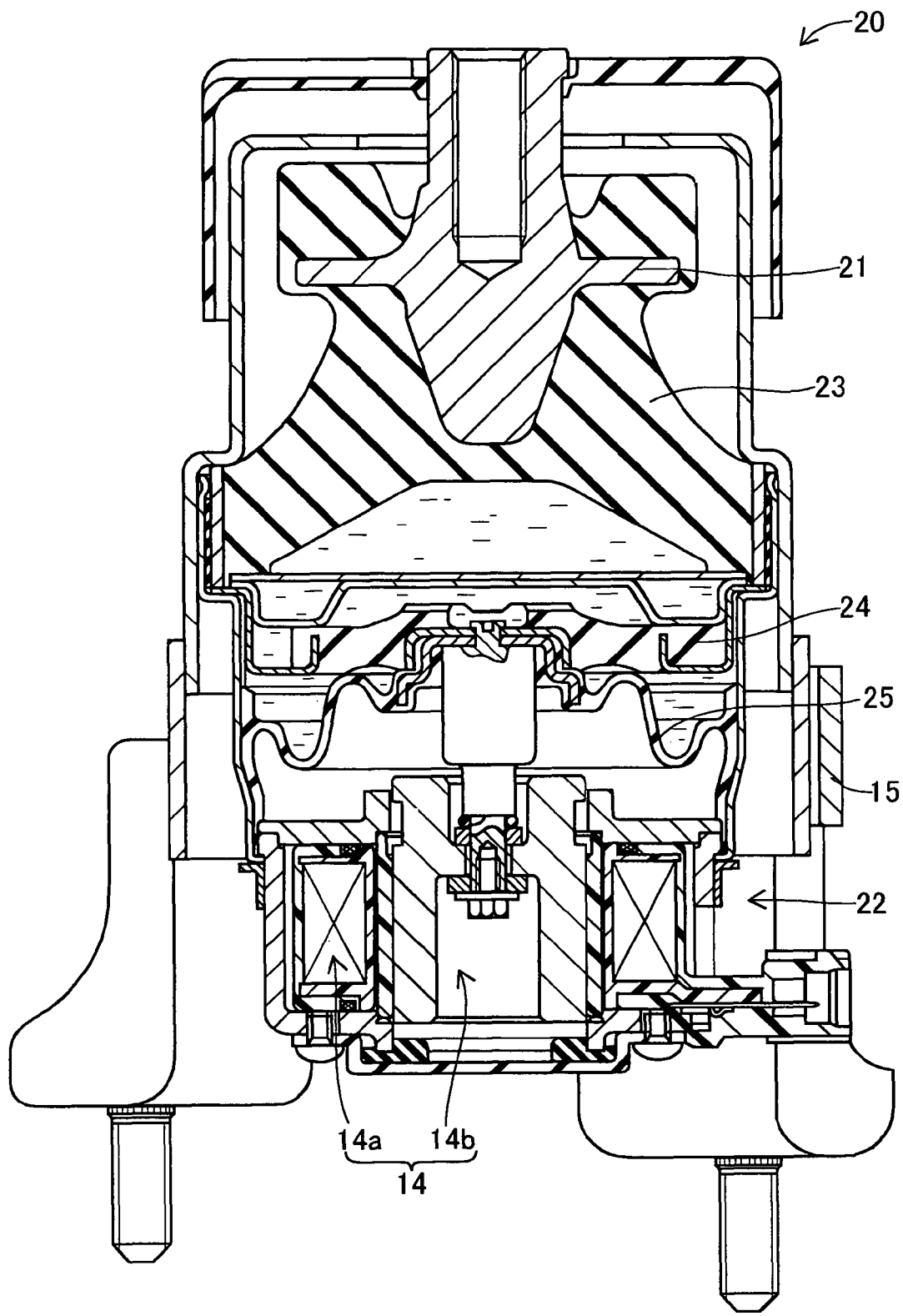
FIG. 2 illustrates a cross-sectional view of an engine mount 20 of the active vibration insulator 1.

Subsequently, a detailed arrangement of the engine mount 20, which comprises the vibrator 14 and the acceleration sensor 15, will be hereinafter described with reference to FIG. 2. FIG. 2 illustrates a cross-sectional view of the engine mount 20.

As shown in FIG. 2, the engine mount 20 comprises a first fixture fitting 21, a second fixture fitting 22, a main rubber elastic body 23, a vibratable plate 24, a diaphragm 25, the vibrator 14, and the acceleration sensor 15.

The first fixture fitting 21 is a first component member to be installed to the engine E/G. The second fixture fitting 22 is formed as a substantially cylinder shape, and is a second component member to be installed to the engine frame E/F. Moreover, the first fixture fitting 21 and the second fixture fitting 22 are separated away from each other, and are disposed to face to each other. In addition, the main rubber elastic body 23 interposes between the first fixture fitting 21 and the second fixture fitting 22 to elastically connect the first fixture fitting 21 with the second fixture fitting 22.

The vibratable plate 24 is formed as a substantially disk shape, and is made of rubber. The vibratable plate 24 is disposed within the second fixture fitting 22 and under the main rubber elastic body 23 in FIG. 2. The vibratable plate 24 and main rubber elastic body 23 form a pressure receiving chamber into which the vibrations emitted from the engine E/G are input. Moreover, the diaphragm 25 is formed of a thin-thickness rubber elastic film so that it is deformable readily. The diaphragm 25 is disposed within the second fixture fitting 22 and under the vibratable plate 24 in FIG. 2. The diaphragm 25 and vibratable plate 24 form an equilibrium chamber which is allowed to undergo volume change with ease. Note that a noncompressible fluid is sealed in the pressure receiving chamber and in the equilibrium chamber. Also note that an orifice passage communicates the pressure receiving chamber with the equilibrium chamber.

The vibrator 14, a solenoid, comprises a substantially-cylinder-shaped core 14a, and a substantially-column-shaped plunger 14b disposed at the center of core 14a. The core 14a forms a coil in which a winding wire is wound, and is fixed to an inner peripheral surface of the second fixture fitting 22 and under the diaphragm 25 in FIG. 2. The plunger 14b is disposed movably with respect to the core 14a axially (or in the up/down direction in FIG. 2). The plunger 14b is fixed to the vibratable plate 24 on the upper opposite-end side in FIG. 2. That is, the vibrator 14 operates to pull the plunger 14b downward in FIG. 2, depending on the electric-current supplies to the coil or winding wire of the core 14a. Thus, the vibratable plate 24 deforms to carry out the pressure control of the pressure receiving chamber, as the plunger 14b reciprocates axially. Moreover, by appropriately deforming the vibratable plate 24 actively to actively change the pressure within the pressure receiving chamber, it is possible to inhibit the vibrations of the engine E/G from transmitting to the engine frame E/F. Note that the plunger 14b reciprocates when the bad-roads processor 16 outputs the control permission signal to the control-signals generator 12, as described above.

On the other hand, when the bad-roads processor 16 outputs the control stop signal to the control-signals generator 12, the actuating voltage, which is applied to the coil or winding wire of the core 14a, is zero virtually. Accordingly, the plunger 14b is put in a free state with respect to the core 14. Note herein that, since the vehicle vibrates greatly when it travels on bad roads, the plunger 14b might move greatly axially with respect to the core 14a as the vehicle vibrates. Moreover, depending on the inductance, which changes as the relative position between the core 14a and the plunger 14b changes, and the actuating voltages, which are applied to the coil of the core 14a, there is a fear that overcurrents flow in the coil of the core 14a. However, when the vehicle travels on bad roads, the actuating voltage, which is applied to the coil of the core 14a, is zero virtually. Consequently, it is possible to inhibit overcurrents from flowing in the coil of the core 14a. Moreover, it is possible as well to inhibit overcurrents from flowing in the actuating circuit of the driver 13, which supplies electric currents to the coil of the core 14a.

The acceleration sensor 15 is fixed to an outer periphery of the second fixture fitting 22. That is, the acceleration sensor 15 meters the vibrations of the second fixture fitting 22 of the engine mount 20.

(3) Detailed Arrangement of Bad-roads Processor 16

Figure 3:
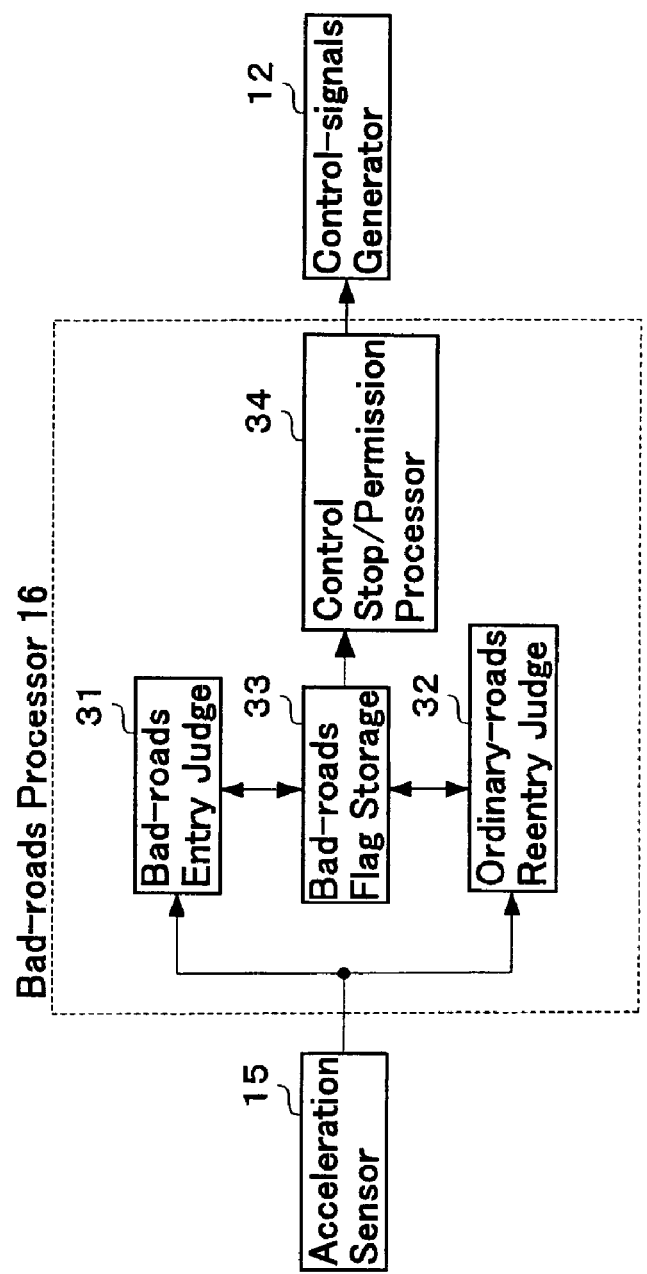
FIG. 3 is a block diagram for illustrating an arrangement of a bad-roads processor 16 of the active vibration insulator 1.
Figure 4:
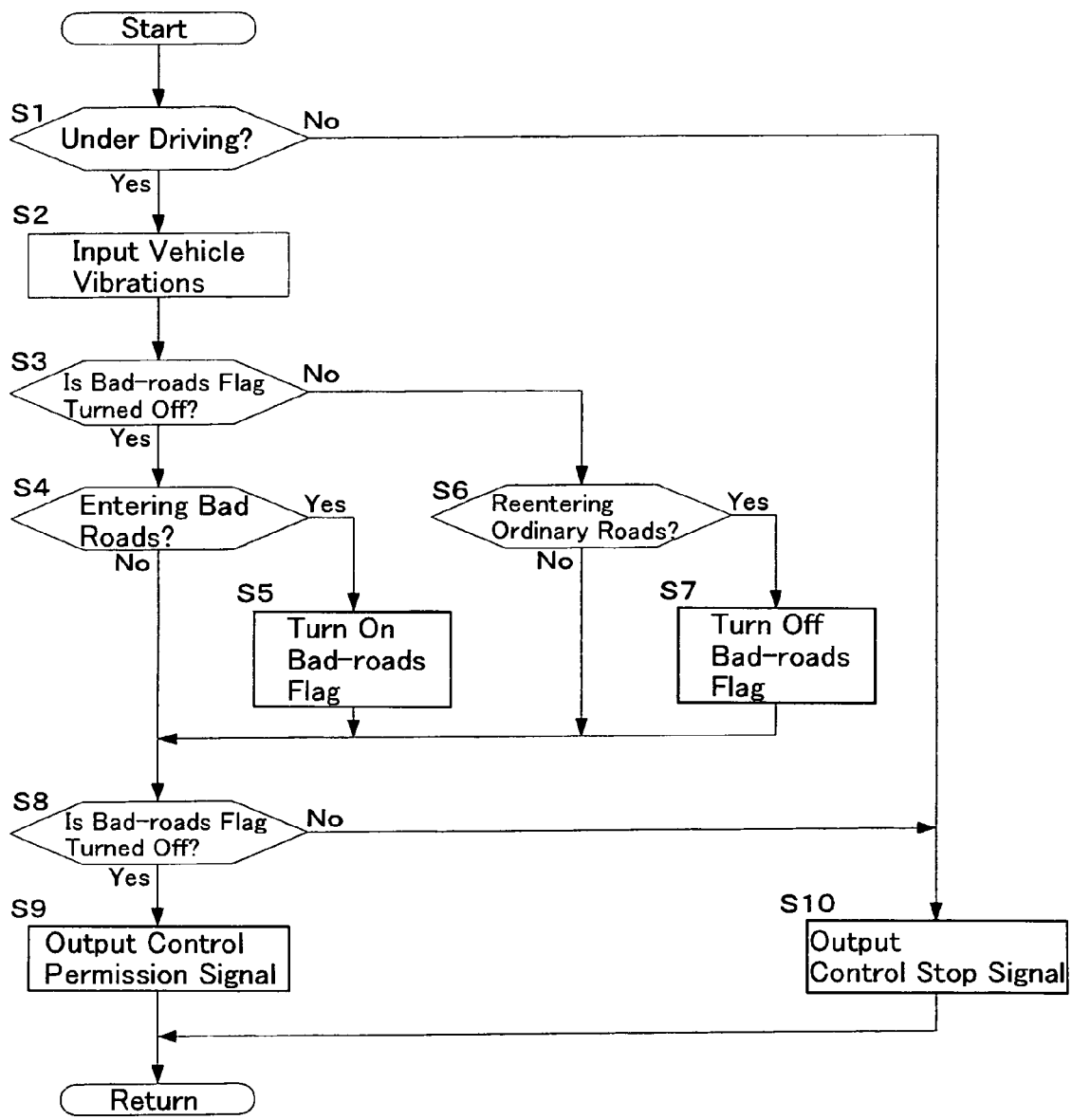
FIG. 4 is a flowchart for illustrating a processing operation of the bad-roads processor 16 of the active vibration insulator 1.

Next, the detailed arrangement of the bad-roads processor 16 will be hereinafter described with reference to FIGS. 3 and 4. FIG. 3 is a block diagram for illustrating the arrangement of the bad-roads processor 16. FIG. 4 is a flowchart for illustrating a processing operation of the bad-roads processor 16.

As shown in FIG. 3, the bad-roads processor 16 comprises a bad-roads entry judge 31, an ordinary-roads reentry judge 32, a bad-roads flag storage 33, and a control stop/permission processor 34.

The bad-roads entry judge 31 (i.e., claimed first judge) receives the vehicle vibrations, which the acceleration sensor 15 detects. When a bad-roads flag, which the bad-roads flag storage 33 stores, is turned off, the bad-roads entry 31 uses the vehicle vibrations to judge whether the vehicle is travelling on bad roads or not. Here, the phrase, "when a bad-roads flag is turned off," specifies cases that the present active vibration insulator according to Example No. 1 regards that the roads, on which the vehicle is now travelling, are ordinary roads, that is, roads which are not considered bad roads. Moreover, the term, "bad-roads entry judgement," specifies to judge whether the vehicle vibrations exceed a predetermined threshold value a plurality of times within each of plural predetermined continuous periods of time or not. For example, the bad-roads entry judge 31 judges that the vehicle enters bad roads when the vehicle vibrations exceed a predetermined threshold value twice, for instance, within one cycle of the pulsating cyclic signals, which the frequency calculator 11 receives, and when the vehicle vibrations exceed a predetermined threshold value twice, for instance, within the following one cycle of the pulsating cyclic signals, which the frequency calculator 11 receives, as well. Thus, the bad-roads entry judge 31 judges whether the vehicle enters bad roads or not while the vehicle is travelling on ordinary roads. Note herein that it is possible to inhibit the present active vibration controller according to Example No. 1 from making misjudgments by letting the bad-roads entry judge 31 judge whether the vehicle vibrations exceed a predetermined threshold value a plurality of times within each of plural predetermined continuous periods of time, as described above. Moreover, when the bad-roads entry judge 31 judges that the vehicle enters bad roads from ordinary roads, the bad-roads entry judge 31 turns on a bad-roads flag, which the bad-roads flag storage 33 stores, to change or update it.

The ordinary-roads reentry judge 32 (i.e., claimed second judge) receives the vehicle vibrations, which the acceleration sensor 15 detects. When a bad-roads flag, which the bad-roads flag storage 33 stores, is turned on, the ordinary-roads reentry 32 uses the vehicle vibrations to judge whether the vehicle reenters ordinary roads or not. Here, the phrase, "when a bad-roads flag is turned on," specifies cases that the present active vibration insulator according to Example No. 1 regards that the roads, on which the vehicle is now travelling, are bad roads. Moreover, the term, "ordinary-roads reentry judgement," specifies to judge whether the vehicle vibrations do not exceed a predetermined threshold value within each of plural predetermined continuous periods of time or not. For example, the ordinary-roads reentry judge 32 judges that the vehicle reenters ordinary roads when the vehicle vibrations do not exceed a predetermined threshold value within one cycle of the pulsating cyclic signals, for instance, which the frequency calculator 11 receives, and when the vehicle vibrations do not exceed a predetermined threshold value within the following one cycle of the pulsating cyclic signals, for instance, which the frequency calculator 11 receives, as well. Thus, the ordinary-roads reentry judge 32 judges whether the vehicle reenters ordinary roads or not while the vehicle is travelling on bad roads. Note herein that it is possible to inhibit the present active vibration controller according to Example No. 1 from making misjudgments by letting the ordinary-roads reentry judge 32 judge whether the vehicle vibrations do not exceed a predetermined threshold value within each of plural predetermined continuous periods of time, as described above. Moreover, when the ordinary-roads reentry judge 32 judges that the vehicle reenters ordinary roads from bad roads, the ordinary-roads reentry judge 32 turns off a bad-roads flag, which the bad-road flag storage 33 stores, to change or update it.

The bad-roads flag storage 31 stores a bad-roads flag. The bad-roads flag, which the bad-roads flag storage 33 stores, is changed or updated by the bad-roads entry judge 31 and the ordinary-roads reentry judge 32. Note that the turned-on bad road flag species that the roads, on which the vehicle is now travelling, are bad roads; and the turned-off bad road flag specifies that the roads, on which the vehicle is now travelling, are ordinary roads, as described above.

The control stop/permission processor 34 receives a bad-roads flag, which the bad-roads flag storage 33 stores. When a bad-roads flag, which the bad-roads flag storage 33 stores, is turned on, the control stop/permission processor 34 outputs a control stop signal to the control-signals generator 12. On the other hand, when a bad-roads flag, which the bad-roads flag storage 33 stores, is turned off, the control stop/permission processor 34 outputs a control permission signal to the control-signals generator 12. That is, the control stop/permission processor 34 keeps outputting the control stop signal for a time period of from the time when the bad-roads entry judge 31 judges that the vehicle enters bad roads to the time when the ordinary-roads reentry judge 32 judges that the vehicle reenters ordinary roads. On the contrary, the control stop/permission processor 34 keeps outputting the control permission signal before the bad-roads entry judge 31 judges that the vehicle is travelling on bad roads as well as for a time period of from the time when the ordinary-roads reentry judge 32 judges that the vehicle reenters ordinary roads to the time when the bad-roads entry judge 31 judges that the vehicle enters bad roads. Note that the present active vibration insulator according to Example No. 1 regards that the vehicle is travelling on bad roads within a time period of from the time when the bad-roads entry judge 31 judges that the vehicle enters bad roads to the time when the ordinary-roads reentry judge 32 judges that the vehicle reenters ordinary roads. Conversely, the present active vibration insulator according to Example No. 1 regards that the vehicle is travelling not on bad roads, but on ordinary roads, before the bad-roads entry judge 31 judges that the vehicle is travelling on bad roads as well as for a time period of from the time when the ordinary-roads reentry judge 32 judges that the vehicle reenters ordinary roads to the time when the bad-roads entry judge 31 judges that the vehicle enters bad roads.

Thus, the control stop/permission processor 34 stops the vibrating-forces generation control when the bad-roads entry judge 31 judges that the vehicle enters bad roads from ordinary roads. On the other hand, the control stop/permission processor 34 resumes the vibrating-forces generation control when the ordinary-roads reentry judge 32 judges that the vehicle reenters ordinary roads from bad roads.

Hereinafter, processing operations of the active vibration insulator 1 arranged as described above will be described with reference to a flowchart illustrated in FIG. 4. First of all, as shown in the drawing, the active vibration insulator 1 judges whether the vehicle is under driving or not, that is, whether the engine E/G is operating or not, at step S1. When the vehicle is not under driving, that is, when the answer is "No" at step S1, the bad-roads processor 16 outputs the control stop signal at step S10. On the other hand, when the vehicle is under driving, that is, when the answer is "Yes" at step S1, the bad-roads processor 16 receives the vehicle vibrations, which the acceleration sensor 15 detects, at step S2.

Subsequently, a bad-roads flag, which is stored in the bad-roads flag storage 33, is changed or updated by turning it on or off at step S3 through step S7. First, the bad-roads entry judge 31 and the ordinary-roads reentry judge 32 judge whether a bad-roads flag, which is stored in the bad-roads flag storage 33, is turned on or off at step S3.

When a bad-roads flag is turned off, that is, when the answer is "Yes" at step S3, specifically, when the vehicle is travelling on ordinary roads, the bad-roads entry judge 31 carries out a bad-roads entry judgement at step S4. According to a result of the bad-roads entry judgement, when the bad-roads entry judge 31 judges that the vehicle does not enter bad roads from ordinary roads at step S4, that is, when the answer is "No" at step S4, specifically, when the vehicle is travelling on ordinary roads continuously, the active vibration insulator 1 advances the processing operations to following step S8 without letting the bad-roads entry judge 31 change or update the bad-roads flag. On the other hand, according to a result of the bad-roads entry judgement, when the bad-roads entry judge 31 judges that the vehicle enters bad roads from ordinary roads at step S4, that is, when the answer is "Yes" at step S4, the bad-roads entry judge 31 turns on the bad-roads flag, which the bad-roads flag storage 33 stores, to change or update it. Then, the active vibration insulator 1 advances the processing operations to following step S8.

Moreover, when the bad-roads flag is turned on, that is, the answer is "No" at step S3, specifically, when the vehicle is travelling on bad roads, the ordinary-roads reentry judges 32 carries out an ordinary-roads reentry judgement at step S6. According to a result of the ordinary-roads reentry judgement, when the ordinary-roads reentry judge 32 judges that the vehicle does not reenter ordinary roads from bad roads at step S6, that is, when the answer is "No" at step S6, specifically, when the vehicle is travelling on bad roads continuously, the active vibration insulator 1 advances the processing operations to following step S8 without letting the ordinary-roads reentry judge 32 change or update the bad-roads flag. On the other hand, according to a result of the ordinary-roads reentry judgement, when the ordinary-roads reentry judge 32 judges that the vehicle reenters ordinary roads from bad roads at step S6, that is, when the answer is "Yes" at step S6, the ordinary-roads reentry judge 32 turns off the bad-roads flag, which the bad-roads flag storage 33 stores, to change or update it. Then, the active vibration insulator 1 advances the processing operations to following step S8.

After the bad-roads entry judge 31 and the ordinary-roads reentry judge 32 turns on or off the bad-roads flag, which the bad-roads flag storage 33 stores, to change or update it at step S3 through step S7, the control stop/permission processor 34 judges whether the bad-roads flag is turned off or not at step S8. When the bad-roads flag is turned off, that is, the answer is "Yes" at step S8, the control stop/permission processor 34 outputs the control permission signal to the control-signals generator 12 at step S9. On the other hand, when the bad-roads flag is turned on, that is, the answer is "No" at step S8, the control stop/permission processor 34 outputs the control stop signal to the control-signals generator 12 at step S10. Thus, the active vibration insulator 1 carries out the above-described processing operations repeatedly.

As described above, the active vibration insulator 1 according to Example No. 1 of the present invention stops the vibrating-forces generation control, which the control-signals generator 12 effects, when the vehicle travels on bad roads. Specifically, the actuating voltage, which the driver 13 applies to the coil or winding wire of the vibrator 14's core 14a, is zero. Therefore, even when the relative position between the core 14a and plunger 14b of the vibrator 14 changes to vary the inductance of the vibrator 14, the active vibration insulator 1 according to Example No. 1 can inhibit overcurrents from flowing in the coil of the core 14a and the actuating circuit of the driver 13. As a result, the active vibration insulator 1 according to Example No. 1 can prevent the vibrator 14 and the driver 13 from breaking down.

Example No. 2

Except that an active vibration insulator 1 according to Example No. 2 of the present invention comprises a control-signals generator 12, which is arranged differently from that of the active vibration insulator 1 according to Example No. 1, it is constructed in the same manner as the active vibration insulator 1 according to Example No. 1. Hereinafter, the active vibration insulator 1 according to Example No. 2 will be described with reference to the modified control-signals generator 12.

In the active vibration insulator 1 according to Example No. 2 of the present invention, the control-signals generator 12 generates a cyclic control signal y to output it to the driver 13 when it receives the control permission signal from the bad-roads processor 16. On the other hand, the control-signals generator 12 does not output a cyclic control signal y to the driver 13 when it receives the control stop signal from the bad-roads processor 16. In the latter instance, the control-signals generator 12 outputs a constant-value signal to the driver 13. The constant-value signal comprises a constant value, which is remarkably smaller than the maximum value of the cyclic control signal y.

The driver 13 drives the vibrator 14 based on the signals which the control-signals generator 12 outputs. That is, when the control-signals generator 12 outputs the cyclic control signal y, the driver 13 drives the vibrator 14 based on the cyclic control signal y. Specifically, in this instance, the driver 13 applies a driving voltage, which is based on the cyclic control signal y, to the vibrator 14 so that an electric current, which depends on the cyclic control signal y, is supplied to the vibrator 14. On the other hand, when the control-signals generator 12 outputs the constant-value, the driver 13 applies a constant driving voltage to the vibrator 14. The constant-value driving voltage comprises a constant voltage, which is remarkably smaller than the maximum value of the driving voltage based on the cyclic control signal y. Thus, the driver 13 drives the vibrator 14 when the bad-roads processor 16 outputs the control permission signal. On the other hand, the driver 13 only applies the constant-value driving voltage to the vibrator 14, but does not drive the vibrator 14 when the bad-roads processor 16 outputs the control stop signal.

Thus, when the bad-roads processor 16 outputs the control permission signal to the control-signals generator 12, the electric-current supply to the coil or winding wire of the solenoid, the vibrator 14, is dependent on the cyclic control signal y. Accordingly, only when the bad-roads processor 16 outputs the control permission signal to the control-signals generator 12, the vibrator 14 generates vibrating forces. On the other hand, when the bad-roads processor 16 outputs the control stop signal to the control-signals generator 12, the electric-current supply to the coil of the solenoid, the vibrator 14, is constant. In this instance, the plunger 14b of the vibrator 14 is consequently fastened in such a manner it is pulled downward to the lower side in FIG. 2 by a predetermined distance, which depends on the constant electric-current supply. That is, the relative position of the vibrator 14's plunger 14b is fixed with respect to the core 14a.

Specifically, the bad-roads processor 16 stops the vibrating-forces generation control, which the control-signals generator 12 effects, when the vehicle travels on bad roads. Moreover, the bad-roads process 16 keeps the driving voltage, which the driver 13 applies to the vibrator 14, at the constant value.

As described above, the active vibration insulator 1 according to Example No. 2 of the present invention fixes the relative position of the vibrator 14's plunger 14b with respect to the core 14a when the vehicle travels on bad roads. Specifically, since the relative position of the vibrator 14's plunger 14b does not change with respect to the core 14a, it is possible to inhibit the inductance of the vibrator 14 from varying. As a result, the active vibration insulator 1 according to Example No. 2 can inhibit overcurrents from flowing in the coil or winding wire of the core 14a and the actuating circuit of the driver 13. Moreover, even when the vehicle travels on bad roads, the active vibration insulator 1 according to Example No. 2 can inhibit the plunger 14b of the vibrator 14 from moving. Therefore, the active vibration insulator 1 according to Example No. 2 can prevent the damages to the vibratable plate 24, for instance, damages which result from the excessively moving plunger 14b. Thus, the active vibration insulator 1 according to Example No. 2 can prevent the broken-down vibrator 14 and driver 13, which result from the overcurrents, which flow in the coil of the vibrator 14's core 14a and the actuating circuit of the driver 13, and the damages to the vibrating plunger 14.

Modified Version

In the above-described active vibration insulator 1 according to Example Nos. 1 and 2 of the present invention, the map control mode is switched to the adaptive control mode, or vise versa. However, the present invention is not limited to such a specific example. For example, the active vibration insulator 1 can employ the map control mode alone, or can employ the adaptive control mode alone.

Having now fully described the present invention, it will be apparent to one of ordinary skill in the art that many changes and modifications can be made thereto without departing from the spirit or scope of the present invention as set forth herein including the appended claims.

What is claimed is:

1. An active vibration insulator, comprising:
    a first member attached to an engine;
    a second member attached to an engine frame;
    a main rubber elastic body elastically connecting the first member and the second member;
    a vibratable plate forming a pressure receiving chamber with the main rubber elastic body, the pressure receiving chamber receiving a vibration from the engine;
    an electromagnetic actuator including a core, around which a coil is wound, attached to the second member and a plunger attached to the vibratable plate and reciprocating relative to the core, the electromagnetic actuator generating vibrating forces depending on electric-current supplies;
    a controller for carrying out vibrating-forces generation control in which the electric-current supplies are made variable so as to actively inhibit vibrations generated by an on-vehicle vibration generating source of a vehicle from transmitting to a specific part of the vehicle based on cyclic pulsating signals output from the on-vehicle vibration generating source, thereby letting the electromagnetic actuator generate the vibrating forces;
    an acceleration sensor fixed to the second member and detecting a vibration of the second member; and
    a bad-roads processor for judging whether or not the vehicle is traveling on a bad road based on the vibration detected by the acceleration sensor and for stopping the vibrating-forces generation control effected by the controller when the vehicle is judged to be traveling on the bad road.

2. The active vibration insulator as claimed in claim 1, wherein the bad-roads processor stops the vibrating-forces generation control when the vehicle enters bad roads, and resumes the vibrating-forces generation control when the vehicle returns ordinary roads out of the bad roads.

3. The active vibration insulator as claimed in claim 2, wherein the bad-roads processor comprises:
    a first judge for judging whether the vehicle enters bad roads based on a first condition;
    a second judge for judging whether the vehicle returns onto ordinary roads out of bad roads based on a second condition, which differs from the first condition; and
    a control-stop processor for stopping the vibrating-forces generation control by the controller when the first judge judges that the vehicle enters bad roads, and resuming the vibrating-forces generation control by the controller when the second judge judges that the vehicle returns onto ordinary roads out of bad roads.

4. The active vibration insulator as claimed in claim 1, wherein the bad-roads processor controls actuating voltages, which the controller applies to the electromagnetic actuator when the vehicle travels on bad roads, to zero.

5. The active vibration insulator as claimed in claim 1, wherein the bad-road processor controls actuating voltages, which is applied to the electromagnetic actuator by the controller when the vehicle is traveling on the bad road, to be a constant value to fix an actuation of the electromagnetic actuator.

6. The active vibration insulator as claimed in claim 3, wherein the first judge judges that the vehicle enters bad roads when the vibrations of the second member, which the acceleration sensor detects, exceed a predetermined threshold value at least at a predetermined time within each of plural predetermined continuous periods of time.

7. The active vibration insulator as claimed in claim 3, wherein the second judge judges that the vehicle returns onto ordinary roads out of bad roads when the vibrations of the second member, which the acceleration sensor detects, do not exceed a predetermined threshold value within each of plural predetermined continuous periods of time.

* * * * *